United States Patent Office 3,424,770
Patented Jan. 28, 1969

3,424,770
PROCESS FOR THE ADDITION OF BISULFITE TO COMPOUNDS CONTAINING DOUBLE BONDS
Werner Stein, Erkrath-Unterbach, Germany, and Hans Kittl, Riehen, Basel-Stadt, Switzerland, assignors to Henkel & Cie. G.m.b.H., Dusseldorf-Holthausen, Germany, a corporation of Germany
No Drawing. Filed Feb. 9, 1965, Ser. No. 431,474
Claims priority, application Germany, Feb. 19, 1964, H 51,747; Feb. 29, 1964, H 51,893
U.S. Cl. 260—400        7 Claims
Int. Cl. C07c *143/02*

ABSTRACT OF THE DISCLOSURE

This invention relates to an improved process for the preparation of organic sulfonates by the addition of a water-soluble bisulfite to the olefinic double bonds of organic compounds containing olefinic double bonds in an aqueous media in the presence of addition catalysts selected from the group consisting of hypochlorous acid and its salts, chlorous acid and its salts and chlorine dioxide and in the presence of organic solvents or concentrated solutions of hydrotropic-acting compounds.

THE PRIOR ART

It is known that compounds containing olefinic double bonds such as, for example, olefins, carboxylic acid esters with either unsaturated alcohol or acid radicals or partly hydrogenated aromatic compounds may be reacted by addition to bisulfite in the presence of free radicals or under the catalytic effect of free radical-forming compounds to sulfonic acids or their salts. A large number of inorganic or organic compounds with catalytic properties have been suggested for this process. Among these compounds belong the oxidizing agents such as nitric acid, nitrous acid, perchloric acid, chromic acid or the salts of the acids named as well as a number of organic peroxides. Since the inorganic oxidizing agents oxidize sulfite ions in relatively pronounced manner to sulfate ions and also effect further secondary reactions, organic peroxides, as for example, tertiary-butyl-perbenzoic acid, are preferred according to the present status of technique.

It is also known to prepare alkylsulfonates by addition of bisulfite to olefins in the presence of organic solvents, which also have a certain water content. In this case the reaction mixture consists, during the reaction, in general of a solution or of two liquid layers, i.e., of one predominantly liquid olefin layer and one organic solvent layer containing the bisulfite ion and some of the olefin. The practical value of this process is, however, limited as special measures have to be taken in order to prevent solvent losses, to recover the solvents from the two phases and the reaction product, as well as for the final recovery of the solvents.

Furthermore, it is known that bisulfite in aqueous solution may react with an olefin to form a sulfonate, when, at a pH value of between 6 and 9, air or a gas containing a molecular oxygen is passed as catalyst through the solution. The yields are increased in this process, when a polar, organic solvent, in particular a monohydric, saturated alcohol with 3 to 5 carbon atoms, as well as possibly a water-soluble, surface-active agent is added. For the attainment of technically utilizable yields, however, reaction periods of 40 to 50 hours are required, which periods are of economically prohibitive length.

An object of the present invention is the development of an improved process for the addition of bisulfite to the double bonds of organic compounds containing olefinic double bonds by the use of a catalytic agent selected from the group consisting of hypochlorous acid and its salts, chlorous acid and its salts and chlorine dioxide.

Another object of the present invention is the development of a process for the addition of a water-soluble bisulfite to the double bonds of organic compounds containing olefinic double bonds which comprises the step of intimately mixing said water-soluble bisulfite with said organic compound containing olefinic double bonds in an aqueous medium in the presence of an addition catalyst selected from the group consisting of hypochlorous acid and its salts, chlorous acid and its salts and chlorine dioxide and in the presence of a solvent selected from the group consisting of organic solvents and concentrated aqueous solutions of hydrotropic-acting compounds.

A further object of the present invention is the development of a process for the preparation of organic sulfonates by the addition of a bisulfite to the double bonds of an organic compound containing olefinic double bonds which comprises the steps of intimately mixing an organic compound containing olefinic double bonds with from about 1 mol to about 4 mols, per mol equivalent of said olefinic double bonds, of a water-soluble bisulfite in the presence of from about 2 to about 15 parts, based on said organic compound containing olefinic double bonds of an aqueous solvent medium selected from the group consisting of (1) from about a 10% to about 40% aqueous polar organic solvent mixture and (2) from about a 10% to about 80% aqueous solution of a hydrotropic-acting compound, heating said mixture to a temperature between about 50° C. and about 100° C., adding to said heated mixture over a period of at least ½ of the total reaction time, from about 1 mol percent to about 30 mol percent, based on the mol equivalent of said olefinic double bonds, of a catalytic agent selected from the group consisting of hypochlorous acid and its water-soluble salts, chlorous acid and its water-soluble salts and chlorine dioxide, and recovering said organic sulfonates.

A still further object of the present invention is the development of an improvement in the process for addition of a water-soluble bisulfite to the double bonds of an organic compound containing olefinic double bonds in the presence of an aqueous solvent and an addition catalyst, the improvement which comprises using as said addition catalyst a member selected from the group consisting of hypochlorous acid and its salts, chlorous acid and its salts and chlorine dioxide.

These and other objects of the invention will become more apparent as the description thereof proceeds.

We have now discovered that certain strongly oxidizing materials, specifically hypochlorous acid and its salts, chlorous acid and its salts and chlorine dioxide, may be utilized as catalysts in the reaction of long-chain unsaturated compounds with bisulfite ions in aqueous media to give excellent yields and short reaction periods. This is completely unexpected as these compounds, the hypochlorites, chlorites and chlorine dioxide, are known to instantaneously oxidize sulfite ions to sulfate ions in aqueous solutions and have been employed for the quantitative titration of sulfites.

These catalysts are utilized in amounts of about 1 to 30 mol percent, preferably 5 to 20 mol percent, based on the olefinic double bonds of the olefin used. However, the instantaneous addition of the total amount or even of large portions of the collectively required amount of these strongly oxidizing catalysts is to be avoided at all costs. As a rule, the catalyst is added continuously and the duration of the catalyst addition is extended over a long period, preferably at least ½ of the total reaction time. For example, the catalyst addition may be carried out continuously or discontinuously over a time interval of up to two-thirds of the total reaction time of about 5 to 8 hours.

The reaction may be conducted appropriately with a certain excess of a water-soluble bisulfite, with respect to the mol equivalent of double bonds in the olefin, in the presence of an aqueous solvent. In place of alkali metal bisulfites, other water-soluble bisulfites, as for example ammonium bisulfite, may be employed. Amounts of about 1.5 mol of bisulfite per mol equivalent of olefinic double bonds are advantageous, but amounts as low as 1 mol to as much as 4 mols or more per mol equivalent of olefinic double bonds may be utilized. The amount of the aqueous solvent may be 2 to 15 times the amount of the olefinic compound. This amount is determined chiefly by the chain length of the compound to be reacted. But it is also restricted by the solubility of the bisulfite in the over-all system, which for this very reason should contain a certain amount of water. When aqueous solvent systems are employed utilizing in addition polar organic solvents, about 10 to 40% of the solution should be water. Useful yields are attained by the concomitant use of polar organic solvents as for example lower alkanols such as methanol, ethanol and isopropanol, or lower alkanones such as acetone, or dioxane in the presence of water as aqueous solvents. The temperature of the reaction may correspond somewhat to the boiling temperature of the solvent used and may lie between about 50° and 100° C.

A special advantage of the process is that the reaction of olefins or their mixtures with bisulfite may be carried out even without organic solvents, i.e. in purely aqueous medium, in short reaction periods with very good yields, if the reaction is conducted in the presence of hydrotropic-acting agents.

A hydrotropic-acting agent is a chemical which has the property of increasing the aqueous solubility of various slightly soluble organic compounds.

Concentrated aqueous solutions of dissolving agents, in particular known hydrotropic substances, boundary surface-active materials, etc. may be used wherein the olefinic compounds to be reacted are solubilized in considerable measure. It is not necessary that the entire amount of olefin to be reacted be dissolved or form a homogenous aqueous phase, it suffices in most cases that only a specific portion is dissolved in the aqueous phase.

Into the aqueous solvent or the solution or dispersion of the olefin or the olefin mixture thus prepared, the water-soluble bisulfite is introduced in solution in water. The water-soluble bisulfite in solid form or as a suspension can also be utilized. By bisulfite we also mean to include pyrosulfites which decompose to bisulfites in the presence of water. It is preferable to make an adjustment to the pH value desired, which lies in the weakly acid to neutral range. Preferably the reaction is conducted at a pH of between about 4 and about 7.

If in the described manner the reaction is conducted in aqueous media and in the presence of a hydrotropic-acting compound named, considerable yield increases are attained even when using the known free-radical former catalysts described previously in the discussion of the previous state of the art.

Among the organic compounds containing olefinic double bonds are such compounds as aliphatic olefins, preferably with a terminal double bond (α-alkenes); partially hydrogenated aromatic compounds such as cycloalkenes and cycloalkadienes; aromatic compounds with unsaturated aliphatic side chains; carboxylic acid esters with an unsaturated alcohol group, especially fatty acid allyl esters, or esters from unsaturated fatty acids and saturated alcohols. Instead of the esters, corresponding aliphatic, hydro-aromatic or aliphatic-aromatic ethers, amines, carbamides or sulfonamides, containing unsaturated bonds, may also be employed. Furthermore, repeatedly unsaturated compounds with conjugated or isolated double bonds may be utilized, as for example esters of unsaturated carboxylic acids, with unsaturated alcohols, aliphatic diolefins and others.

These organic compounds containing olefinic double bonds are preferably selected from 1-alkenes having 6 to 22 carbon atoms, alkadienes having 6 to 22 carbon atoms, alkenyl alkanoates having 10 to 24 carbon atoms, alkenyl-benzenes having 10 to 24 carbon atoms, alkyl higher-alkenoates having 10 to 24 carbon atoms, alkenyl alkenoates having 10 to 24 carbon atoms, cyclohexene, and cyclohexadiene.

As dissolving agents are the polar organic solvents mentioned above and the hydrotropic-acting compounds. Among the preferable hydrotropic substances are, for example alkali-metal butyrates, alkali-metal benzoates, water-soluble toluene sulfonates, water-soluble alkylarylsulfonates, water-soluble partly hydrogenated arylsulfonates, water-soluble mineral oil sulfonates, etc.; furthermore, known surface-active boundary materials of preferably anion-active nature are to be considered.

A particularly preferable form of process is presented by the usage of solutions of these sulfonates which are to be prepared from the reaction, as for example 3 - (lauroyloxy) - propane - (1) - sulfonate and dodecyl-(1)-sulfonate. However, it may be especially suitable to use dissolving agents of a different type, namely then when the reaction products together with the corresponding dissolving agents display characteristics of particularly applicable technique.

The aqueous concentrations of the hydrotropic dissolving agents lie between 10 and 80%, especially at 20 to 50%.

A period for catalyst addition of 2 to 5 hours with an over-all reaction time of 5 to 8 hours has been found especially advantageous. At any rate, the addition shall be made continuously, for example within a time period which corresponds to at least ½ or preferably to ⅔ of the total reaction period. The water-soluble bisulfites as indicated above are preferably alkali metal pyrosulfites, alkali metal bisulfites, ammonium bisulfite and others. They are preferably used in amounts of about 1.5 mol of bisulfite per mol of olefin double bond, however, these amounts may be increased or decreased.

The present process renders the preparation of the most variant sulfonates in short reaction periods and excellent yields in technically advantageous manner possible. The process acts especially advantageous, when hypochlorous acid or its salts, chlorous acid or its salts or chlorodioxide are used as catalysts, and when a hydrotropic substance resulting from the reaction is used as a dissolving agent.

The following examples serve to illustrate the invention without however limiting its scope in any respect.

Example I 33.6 gm. (0.2 mol) of dodecen-(1), 30 gm. of $Na_2S_2O_5$ (equivalent to 0.316 mol of $NaHSO_3$), 120 ml. of water and 330 ml. of methanol were stirred at reflux at a temperature of about 70° C. In the course of 3 hours 8 ml. of a 9.2% sodium hypochlorie solution (about 0.75 gm. of NaOCl or 0.01 mol) were added dropwise and continuously. The total reaction time amounted to 6 hours. Thereafter, the reaction mixture was diluted with 210 ml. of water and for the purpose of determining the reaction degree it was extracted three times with hot benzene. The sulfonate thus formed was obtained from the aqueous phase by crystallization and/or evaporation. The yield of the sodium salt of dodecane-sulfonic acid amounted to 95.7% of the theory, based on reacted olefin.

Example II 48.0 gm. (0.2 mol) of the allyl ester of lauric acid were reacted, as in Example I, in methanol-water with 30 gm. of $Na_2S_2O_5$, by continuously adding dropwise, within a period of 4 hours, 25 ml. of a 9.2% sodium hypochlorite solution (about 2.3 gms. of NaOCl or 0.03 mol), then stirring the mixture for a further 2 hours.

This process yielded 91.7% of the theory of sodium salt of 3-(lauroyloxy)-propane-(1)-sulfonic acid.

Example III 39.6 gm. of undecylenic acid methyl ester (0.2 mol) were reacted in methanol-water, as in Example I, with sodium bisulfite. 10 ml. of a 9.2% sodium hypochlorite solution (about 0.95 gm. of NaOCl) were added continuously and dropwise over a period of 4 hours. After having stirred this mixture for 2 hours, the undecanylic acid methyl ester-sodium sulfonate thus formed was obtained with a yield of 99% of the theory.

Example IV 16.4 gm. of cyclohexene (0.2 mol) were, as in Example I, reacted with sodium bisulfite in methanol-water. In the course of 3 hours 10 ml. of a 9.2% sodium hypochlorite solution were added dropwise. After a total reaction period of 6 hours, and after evaporation and drying, a raw sulfonate yield of 49.2 gm. was obtained, which corresponded to a practically quantitative yield of sodium cyclohexane-sulfonate.

Example V 50.5 gm. of octadecene-(1) (0.2 mol) were, as in Example I, reacted with sodium bisulfite in methanol-water. In the course of 4 hours a solution of 1.2 gm. of chlorine dioxide (0.018 mol) in 40 ml. of water was added dropwise as catalyst. After a reaction period of 6 hours the sodium octadecane-sulfonate thus formed was obtained with a yield of 73.5%.

Example VI 33.6 gm. (0.2 mol) of dodecene-(1), 30 gm. of $Na_2S_2O_5$ 100 ml. of water and 330 ml. of methanol were stirred together at reflux temperature. A solution of 5 gm. of sodium chlorite (0.055 mol) in 40 ml. of water was added continuously and dropwise over a period of 4 hours and stirred for a further 2 hours. The yield of the sodium salt of dodecane-sulfonic acid amounted to 85.7% of theory.

Example VII 33.6 gm. (0.2 mol) of dodecene-(1), 30 gm. of $Na_2S_2O_5$, 330 ml. of methanol and 120 ml. of water were stirred together at the reflux temperature of about 70° C. During the course of 4 hours, 8 ml. of an about 10% sodium hypochlorite solution were added continuously and dropwise, and the mixture was stirred for one more hour. Then the reaction was discontinued after a total period of 5 hours. The yield of the sodium salt of dodecane-sulfonic acid was 95.5% of theory.

Example VIII 33.6 gm. (0.2 mol) of dodecene-(1), 30 gm. of $Na_2S_2O_5$, 330 ml. of methanol and 100 ml. of water were, as in Example VII, stirred together at reflux temperature, and also over a period of 4 hours, 8 ml. of an about 10% sodium hypochlorite solution were added dropwise and continuously. Thereafter, the reaction was immediately, that is after a total period of 4 hours, discontinued. The yield of the sodium salt of dodecane-sulfonic acid was 82.5% of theory.

Example IX 33.6 gm. (0.2 mol) of dodecene-(1), 30 gm. of $Na_2S_2O_5$ 330 ml. of methanol and 100 ml. of water were stirred together at reflux temperature for a total period of 6 hours. The periods of adding dropwise 2 different amounts of an about 10% sodium hypochlorite solution were varied and each time the yield obtained was determined. The results may be derived from the following table:

| Ml. NaOCl added (ca. 10%) | Period of dropwise addition (hours) | Percent of reacted $C_{12}$ olefin |
|---|---|---|
| 8 | 4 | 95–96 |
| 8 | 3 | 95–96 |
| 8 | 2 | 94 |
| 8 | 1 | 94 |
| 8 | 0.5 | 88 |
| 6 | 2 | 92 |
| 6 | 1 | 82 |

Example X 42.1 gm. of olefin mixture (containing about 25 mol percent each of $C_{12}$, $C_{14}$, $C_{16}$ and $C_{18}$ olefins) were, analogous to Example I, reacted with $Na_2S_2O_5$ in a solvent mixture consisting of 120 ml. of water, 165 ml. of methanol and 165 ml. of ethanol. 25 ml. of a 9.2% NaOCl solution as catalyst were added continuously and dropwise over a period of 4 hours. Total reaction period: 6 hours. Yield: 86.7% of theory.

A further experiment with the use of isopropanol (165 ml. of methanol, 165 ml. of isopropanol, 120 ml. of water), resulted in a yield of 87% of theory.

Example XI 200 gm. of a 30% aqueous solution of sodium 3-(lauroyloxy)-propane-(1)-sulfonate were admixed, in a 1-liter beaker with an inlet flange (Wittich top), with 28.5 gm. of sodium pyrosulfite, 2 gm. of sodium sulfite and 48 gm. (0.2 mol) of lauric acid allyl ester and heated to 90 to 95° C. under stirring (porcelain stirrer) and reflux cooling. Then 50 ml. of a 5% sodium hypochlorite solution were added continuously and dropwise over a period of 4 hours. The pH value, measured with a glass electrode, was maintained constant at 5.2 with the aid of a few drops of a 10% sodium hydroxide solution. After a total reaction period of 6 hours the pH value was increased to 7 with the aid of sodium hydroxide and the reaction mixture was diluted with an equal volume of water. By extracting three times with hot benzene (80–110° C.) the unsulfonated portion (US) was separated. The aqueous solution could be worked up by evaporation and extraction of the residue with alcohol or could be utilized as such after oxidation of the residual sulfite to sulfate. The yield was calculated from the unsaturated material recovered. Based on the lauric acid allyl ester used, the yield amounted to 86.8% of theory with 13.2% of unsaturated starting material recovered.

Example XII

Example XI was repeated, only the ratio of sodium bisulfite:sodium sulfite was varied from 95:5 mol percent to 90:10 mol percent; instead of 28.5 gm. of sodium pyrosulfite, 27 gm. were used; instead of 2 gm. of sodium sulfite, 4 gm. were used. The pH value was maintained at 5.5 to 5.8 during the reaction. The yield was 90% of theory (10% of unsaturated material recovered).

Example XIII

Analogous to Examples XI and XII, under otherwise identical conditions, the ratio of sodium bisulfite:sodium sulfite was varied to 85:15 mol percent. 25.5 gm. of sodium pyrosulfite and 6 gm. of sodium sulfite were used (pH value was about 6). The yield was 90.8% of theory (9.2% of unsaturated material recovered).

Example XIV

In analogous manner as in Examples XI, XII and XIII, the bisulfite-sulfite ratio was varied to 80:20 mol percent (24 gm. of sodium pyrosulfite and 8 gm. of sodium sulfite) (pH value between 5.9 and 6.5). The yield was 88.7% of theory (11.3% of unsaturated material recovered).

Example XV

Example XII was repeated utilizing 200 gm. of a 30% aqueous solution of sodium alkyl-sulfonates (commercial product: "Mersolat H") instead of a solution of sodium 3-(lauroyloxy)-propane-(1)-sulfonate, that means 90 mol percent of bisulfite and 10 mol percent of sulfite were used (pH value was 5.7 to 6.0). The yield was 91% of theory (9% of unsaturated material recovered).

Example XVI

Example XIII was repeated with 200 gm. of a 30% aqueous solution of sodium alkyl-sulfonates (commercial product: "Mersolat H") analogous to Example XV, that means 85 mol percent of bisulfite and 15 mol percent of sulfite were used (pH value was 6.2 to 6.6). The yield was 93% of theory (7% of unsaturated material recovered).

Example XVII

Example XIV was repeated with 200 gm. of a 30% aqueous solution of sodium alkyl-sulfonates (commercial product: "Mersolat H"), analogous to Example XV, that means 80 mol percent of bisulfite and 20 mol percent of sulfite were used (pH value was 5.9 to 6.7). The yield was 90.8% of theory (9.2% of unsaturated material recovered).

Example XVIII 200 gm. of a 30% aqueous sodium 3-(lauroyloxy)-propane-(1)-sulfonate solution were admixed, in a beaker with inlet flange (Wittich top), with 21 gm. of sodium pyrosulfite, 4 gm. of sodium sulfite and 48 gm. (0.2 mol) of lauric acid allyl ester and heated under stirring (porcelain stirrer) to 90° C. Thereafter, 50 ml. of a 5% sodium hypochlorite solution were added dropwise over a period of 4 hours (12.5 ml. per hour).

In the beginning the pH value was between 5 and 6. A further 8 gm. of sodium sulfite, dissolved in 40 ml. of water, were added in portions in intervals of about 30 minutes, in such amounts that the pH value returned each time to the initial value. The last portion was added after about 5 hours, and the reaction was discontinued after a total of 6 hours. By this mode of working the pH value was always above 4.

The reaction mixture was adjusted, with the aid of dilute sodium hydroxide, to a pH value of 7 and was diluted with at least the same volume of water. The unsulfonated material was separated by extracting it three times with hot benzene (80 to 110° C.). The aqueous solution could be worked up by evaporation and extraction of the residue with alcohol or could be used as such after oxidation of the sulfite to sulfate. The yield was 86.2% of the theory (6.6 gm.=13.8% of unsaturated material recovered; acid number=19.3).

From the low acid number and unsaturated material recovered it could be derived that under the conditions chosen practically no ester-sulfonate was saponified. The starting lauric acid allyl ester had an acid number of 5.4; the initially present acid, consequently, was merely enriched in the unsaturated material recovered.

Example XIX

A 0.4 mol experiment was carried out under conditions analogous to Example XVIII. The pH value was measured with a glass electrode and maintained constant at 5.5. A solution of 16 gm. of sodium sulfite in 60 ml. of water was added dropwise in this reaction in such a controlled rate that the pH value remained at 5.5. After a period of 4 hours of addition, the small remainder of the sulfite solution was added all at once, causing the pH value to rise to 6.1. The sodium hypochlorite solution was added under the same conditions as in Example XVIII. By this mode of working, the sulfite was still at disposal for the reaction. The subsequent working up of the reaction mixture was performed for this experiment, as well as for the following examples, as described in Example XVIII. The yield was 82.7% of the theory (17.3% of unsaturated materials recovered; acid number of unsaturated fraction=27.8).

Example XX

A 0.4 mol experiment was, analogous to Example XIX, performed with a 40% aqueous sodium 3-(lauroyloxy)-propane-(1)-sulfonate solution. The yield was 84.6% (15.4% of unsaturated materials recovered).

Example XXI

A 0.4 mol experiment was, analogous to Example XIX, performed with a 25% aqueous sodium 3-(lauroyloxy)-propane-(1)-sulfonate solution. The yield was 83.3% of theory (16.7% of unsaturated materials recovered).

Example XXII 200 gm. of a 30% aqueous sodium tetrapropylene-benzene-sulfonate solution were used as the hydrotropic solution, otherwise the experiment was carried out analogous to Example XIX. During the working up (after about 30 minutes) the reaction mixture became pasty. The yield was 78.3% (21.7% of unsaturated materials recovered).

Example XXIII

Example XXII was repeated with a 30% aqueous solution of a sodium aliphatic alkane-sulfonate as the hydrotropic solution (commercial product "SaSE 421"). The yield was 89.2% of theory (10.8% of unsaturated materials recovered).

Example XXIV 200 gm. of a 7% aqueous solution of sodium 3-(lauroyloxy)-propane-(1)-sulfonate were heated with 48 gm. (0.2 mol) of lauric acid allyl ester, 25.5 gm. of sodium pyrosulfite and 6 gm. of sodium sulfite under stirring and at the reflux temperature of 90 to 95° C. 50 mol of a 5% NaOCl solution were added continuously dropwise over a period of 4 hours, as catalyst. Total reaction time: 6 hours. The yield was 39% of theory (61% of unsaturated material recovered).

In this example, for each 0.2 mol of allyl ester, 0.04 mol of starting hydrotropic sulfonate were used, corresponding to 20 mol percent (based on the allyl ester used). This example shows that with dilute hydrotropic sulfonate additions (up to 15 mol percent) in an alcohol-free medium, no satisfactory reaction could be obtained.

Example XXV

Analogous to Example XXIV, 200 gm. of a 15% solution of the same starting hydrotropic sulfonate were used, corresponding to 0.085 mol or 42.5 mol percent (based on the olefin used). The yield was 62% of theory (38% of unsaturated material recovered).

Example XXVI

Analogous to Example XXIV, 200 gm. of a 20% solution of the same starting hydrotropic sulfonate were used, corresponding to 0.113 mol or 56.6 mol percent (based on the allyl ester used). The yield was 91.7% of theory (8.3% of unsaturated materials recovered).

As Example XXVI showed, optimal yields could be obtained already with a 20% solution.

Example XXVII

Analogous to Example XXIV, 200 gm. of a hydrotropic solution were used, this solution containing 20% of sodium 3-(lauroyloxy)-propane-(1)-sulfonate, as well as 10% of sodium p-toluene-sulfonate. The yield was 90% of theory (10% of unsaturated materials recovered).

Example XXVIII

Analogous to Example XXIV, 200 gm. of a 30% aqueous sodium p-toluene-sulfonate solution were used (corresponding to 0.38 mol or 190 mol percent, based on the allyl ester used). The yield was 82.9% of theory (17.1% of unsaturated materials recovered).

Example XXIX

Example XXVII was repeated with 200 gm. of a 50% aqueous sodium p-toluene-sulfonate solution (corresponding to 0.638 mol or 319 mol percent, based on the allyl ester used). The yield was 91.9% of theory (8.1% of unsaturated materials recovered).

Example XXX 62.4 gm. (0.2 mol) of a technical stearic acid allyl ester were used, analogous to Example XXIV, in 200 gm. of an aqueous solution containing 20% of sodium 3-(stearoyloxy)-propane-(1)-sulfonate and 10% of sodium $\alpha$-sulfo-higher fatty acid methyl ester (basically stearic acid). The yield was 84.6% of theory (15.4% of unsaturated materials recovered).

Example XXXI 48 gm. of lauric acid allyl ester (0.2 mol) were reacted in 200 gm. of a 30% aqueous solution of sodium aliphatic sulfonates with 25.5 gm. of sodium pyrosulfite and 6 gm. of sodium sulfite as in Example XXIV. In other words, for each mol of olefin, 1.5 mols of total sulfite were used. The yield was 92.9% of theory (7.1% of unsaturated materials recovered).

Example XXXII

Example XXXI was repeated with 1.4 mols of total sulfite per each mol of olefin (24 gm. of sodium pyrosulfite and 5.3 gm. of sodium sulfite). The yield was 90.3% of theory (9.7% of unsaturated materials recovered).

Example XXXIII

Example XXI was repeated with 1.3 mols of total sulfite per each mol of olefin (21 gm. of sodium pyrosulfite and 54.9 gm. of sodium sulfite). The yield was 89.2% of theory (10.8% of unsaturated materials recovered).

Example XXXIV

Example XXXI was repeated with 1.2 mols of total sulfite per each mol of olefin (19.5 gm. of sodium pyrosulfite and 4.5 gm. of sodium sulfite). The yield was 84% of theory (16% of unsaturated materials recovered).

Example XXXV 48 gm. (0.2 mol) of lauric acid allyl ester were reacted in 100 gm. of a 30% aqueous sodium 3-(lauroyloxy)-propane-(1)-sulfonate solution with 25.5 gm. of sodium pyrosulfite and 6 gm. of sodium sulfite under stirring and reflux cooling at 90 to 95° C. Over a period of 4 hours with a pH value ranging between 5.8 and 4.5, 50 ml. of a 5% sodium hypochlorite solution was added continuously and dropwise as catalyst. The reaction was continued for a total reaction period of 6 hours. The yield was 83.1% of theory (16.9% of unsaturated materials recovered).

Example XXXVI 48 gm. (0.2 mol) of lauric acid allyl ester were reacted in 200 gm. of a 30% aqueous sodium olefin-sulfonate solution (prepared by sulfonation of a $C_{15}$–$C_{18}$ olefin mixture of an average chain length of 16 carbon atoms) with 27 gm. of sodium pyrosulfite and 4 gm. of sodium sulfite. As catalyst 50 ml. of a 5% sodium hypochlorite solution were added continuously and dropwise over a period of 4 hours (pH value: 5.6 to 5.9). The yield was 79.2% of theory (20.8% of unsaturated materials recovered).

Example XXXVII 34 gm. (0.2 mol) of $C_{12}$-$\alpha$-olefin were reacted in a 30% aqueous sodium dodecane-(1)-sulfonate solution with 25.5 gm. of sodium pyrosulfite and 6 gm. of sodium sulfite at a temperature of 95° C. As catalyst 50 ml. of a 5% sodium hypochlorite solution were added continuously and dropwise over a period of 4 hours. Total reaction time: 6 hours. The yield was 80.6% of theory (19.4% of unsaturated materials recovered).

Example XXXVIII

As in Example XXXVII, 16 gm. of cyclohexadiene were reacted in 200 gm. of a 30% aqueous sodium p-toluene-sulfonate solution, however, as catalyst a solution of 5 gm. of sodium chlorite in 50 ml. of water was used. The recovery steps were performed as in the previous examples. The yield was 82.5% of theory (17.5% of unsaturated materials recovered).

Example XXXIX 48 gm. of lauric acid allyl ester (0.2 mol), 25.5 gm. of sodium pyrosulfite (85 mol percent) and 6.0 gm. of sodium sulfite (15 mol percent) (altogether 0.3 mol) were heated in 200 gm. of a 30% aqueous solution of sodium aliphatic sulfonates (commercial product: "Mersolat H") to 95° C. (stirring and reflux cooling). 12 ml. of a 2.2% NaOCl solution (=1.8 mol percent, based on the allyl ester) were added dropwise and continuously over a period of 4 hours. The reaction was finished after 6 hours. The yield was 81.5% (18.5% of unsaturated materials recovered).

Example XXXX 48 gm. (0.2 mol) of lauric acid allyl ester were reacted in 200 gm. of a 30% aqueous soduim 3-(lauroyloxy)-propane-(1)-sulfonate solution with 25.5 gm. of sodium pyrosulfite and 6 gm. of sodium sulfite under stirring and reflux cooling at 90 to 95° C. Over a period of 4 hours with a pH value ranging between 5.8 and 4.5, a solution of 3 gm. of 50% tertiary-butyl-perbenzoate (dissolved in a plasticizing agent) in 20 ml. of ethanol was added continuously and dropwise as a catalyst. The reaction was continued for a total reaction period of 6 hours. Yield: 97.5% of theory (2.5% of unsaturated materials recovered taking into consideration the unsaturated materials introduced by the catalyst and plasticizing agent).

Example XXXXI

Example XXXX was repeated, but as catalyst a suspension of 4.25 gm. of chloride of lime bleaching powder in 50 ml. of water was continuously added over a period of 4 hours (cloudy reaction mixture). The yield was 87.7% of theory (12.3% of unsaturated materials recovered).

Example XXXXII

Example XXXX was repeated, but as catalyst a solution of 5 gm. of p-toluene-(N-methyl-N-nitroso)-sulfonamide in 40 ml. of isopropanol was added dropwise and continuously over a period of 4 hours. The yield was 89.4% of theory (10.6% of unsaturated materials recovered).

Example XXXXIII 16.4 gm. (0.2 mol) of cyclohexene were reacted in 200 gm. of a 30% aqueous sodium cyclohexane-sulfonate solution with 25.5 gm. of sodium pyrosulfite and 6 gm. of sodium sulfite at a temperature of 95° C. As catalyst, a solution of 2 gm. of sodium nitrite in 50 ml. of water were added continuously and dropwise over a period of 4 hours (pH value was 5.4 at the beginning and 7.7 at the end). In this example, due to the low boiling point of the cyclohexene, the extraction for unsaturated materials was conducted three times with ether instead of with benzene. After drying the ether was distilled in a distillation column from the unsaturated materials recovered. The yield was 98% of theory (2% of unsaturated materials recovered).

Example XXXXIV

Analogous to Example XXXXIII, 48 gm. (0.2 mol) of lauric acid allyl ester were reacted in 200 gm. of a 30% aqueous solution of unbranched alkylbenzene-sulfonate (sodium salt), however, as catalyst a solution of 3.5 ml. of isopropylnitrite (freshly prepared) in 20 ml. of isopropanol was added continuously and dropwise over a period of 4 hours. The yield was 85.4% of theory (14.6% of unsaturated materials recovered).

The preceding specific embodiments are illustrative of the invention. It is obvious however that other practices known to those skilled in the art may be employed without departing from the spirit of the invention or the scope of the appended claims.

We claim:

1. A process for the preparation of organic sulfonates by the addition of a bisulfite to the double bonds of an organic compound containing olefinic double bonds which comprises the steps of intimately mixing an organic compound containing olefinic double bonds selected from the group consisting of 1-alkene having 6 to 22 carbon atoms, alkadiene having 6 to 22 carbon atoms, alkenyl alkanoate having 10 to 24 carbon atoms, alkenyl-benzene having 10 to 24 carbon atoms, alkyl higher-alkenoate having 10 to 24 carbon atoms, alkenyl alkenoate having 10 to 24 carbon atoms, cyclohexene and cyclohexadiene with from 1 mol to 4 mols, per mol equivalent of said olefinic double bonds, of a water-soluble bisulfite selected from the group consisting of alkali metal pyrosulfite, alkali metal bisulfite and ammonium bisulfite in the presence of from 2 to 15 parts, based on said organic compound containing olefinic double bonds of an aqueous solvent medium selected from the group consisting of (1) from a 10% to 40% aqueous lower alkanol solvent mixture and (2) from a 10% to 80% aqueous solution of a hydrotropic acting compound selected from the group consisting of alkali metal salts of acids selected from the group consisting of butyric acid, benzoic acid, toluene-sulfonic acid, alkylbenzene-sulfonic acid having 10 to 24 carbon atoms, partially hydrogenated benzene-sulfonic acids, mineral oil sulfonic acids, alkyl-sulfonic acids having 6 to 22 carbon atoms, sulfoalkyl alkanoates having 10 to 24 carbon atoms, alkyl sulfo-higher-alkanoates having 10 to 24 carbon atoms and sulfoalkyl sulfoalkanoates having 10 to 24 carbon atoms, heating said mixture to a temperature between 50° C. and 100° C., adding to said heated mixture over a period of at least ½ of the total reaction time, from 1 mol percent to 30 mol percent, based on the mol equivalent of said olefinic double bonds, of a catalytic agent selected from the group consisting of hypochlorous acid and its water-soluble salts, chlorous acid and its water-soluble salts and chlorine dioxide while maintaining the pH of said mixture between 4 and 7, and recovering said organic sulfonates.

2. In the process for addition of a water-soluble bisulfite to the double bonds of an organic compound containing olefinic double bonds in the presence of an aqueous solvent and an addition catalyst, the improvement which comprises using as said addition catalyst from 1 mol percent to 30 mol percent, based on the mol equivalent of said olefinic double bonds, of a member selected from the group consisting of hypochlorous acid and its water-soluble salts, chlorous acid and its water-soluble salts and chlorine dioxide, said addition catalyst being added to the reaction mixture over a period of at least ½ the total reaction time while maintaining said reaction mixture at a pH of from 4 to 7.

3. The process of claim 1 wherein said aqueous solvent medium is from a 10% to 40% aqueous polar lower alkanol solvent mixture.

4. The process of claim 1 wherein said aqueous solvent mixture is from a 10% to 80% aqueous solution of said hydrotropic-acting compound.

5. The process of claim 1 wherein said catalytic agent is sodium hypochlorite.

6. The process of claim 1 wherein said catalytic agent is chlorine dioxide.

7. The process of claim 1 wherein said catalytic agent is sodium chlorite.

References Cited
UNITED STATES PATENTS

| | | | |
|---|---|---|---|
| 1,920,585 | 8/1933 | Ott et al. | 260—400 |
| 2,023,769 | 12/1935 | Ott et al. | 260—400 |
| 3,275,681 | 9/1966 | Emerson et al. | 260—513 |
| 3,356,717 | 12/1967 | Furrow et al. | 260—513 |

ALEX MAZEL, *Primary Examiner.*

J. H. TURNIPSEED, *Assistant Examiner.*

U.S. Cl. X.R.

260—457, 460, 481, 503, 513, 686